April 30, 1929.  E. VAN DER PYL  1,711,207
PNEUMATIC SHOCK ABSORBER
Filed March 10, 1925   2 Sheets-Sheet 1

Witnesses
Harold W. Eaton
Betsy Jenks

Inventor
Edward Van der Pyl
By
Clifton K. Jenks
Attorney

April 30, 1929.  E. VAN DER PYL  1,711,207
PNEUMATIC SHOCK ABSORBER
Filed March 10, 1925  2 Sheets-Sheet 2
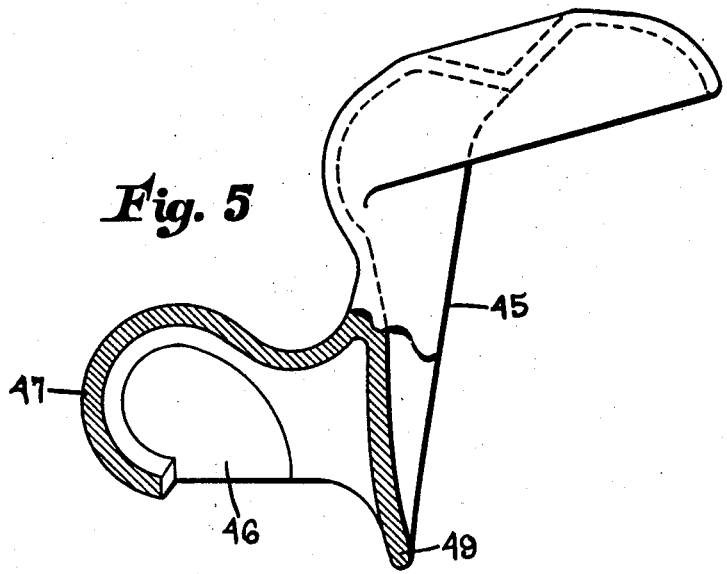
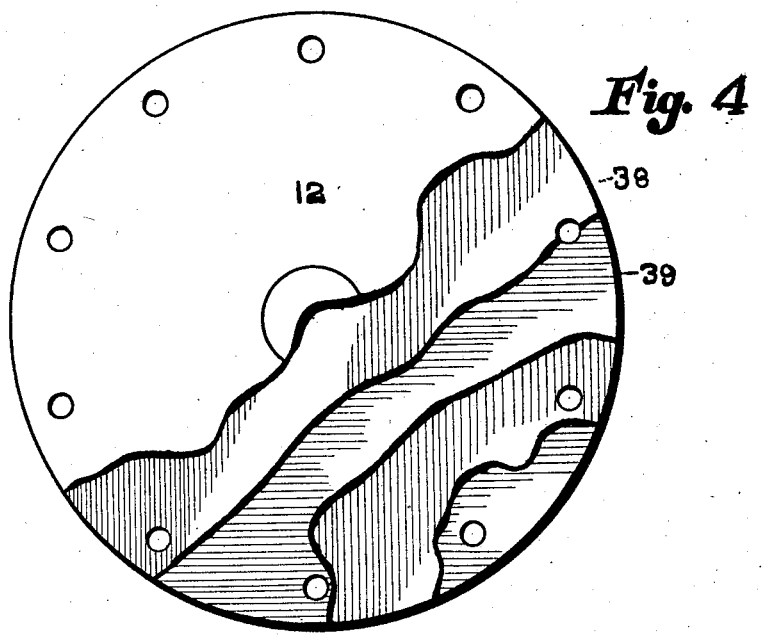
Witnesses
Harold W. Eaton
Clarissa T. Jenks
Inventor
Edward Van der Pyl
By Clayton R. Jenks
Attorney Patented Apr. 30, 1929.

1,711,207

UNITED STATES PATENT OFFICE.

EDWARD VAN DER PYL, OF HOLDEN, MASSACHUSETTS.

PNEUMATIC SHOCK ABSORBER.

Application filed March 10, 1925. Serial No. 14,493.

This invention relates to shock absorbers of the type shown in my prior Patent No. 1,467,986 dated September 11, 1923.

In the form shown in my patent, the diaphragm is made up of two layers of flexible material clamped between parallel annular flanges at its periphery. A bolt passing through a central perforation serves to clamp the diaphragm between its supporting perch and a clamping plate. In that construction, there is a tendency for the air compressed within the casing to leak out between the clamping flanges or around the central bolt. There, moreover, are manufacturing difficulties involved in such an arrangement which detract from its commercial applicability.

It is accordingly an object of my invention to overcome such objectionable characteristics inherent in the prior construction and to make a shock absorber which will give a long life of useful service and require the minimum of care and attention, and which will be highly impervious to air and so will not necessitate frequent renewals of the air pressure in the casing.

A further object is to provide a construction which permits the diaphragm to be secured firmly to the casing and mounted on its supporting perch without weakening the diaphragm and causing air leakage.

A still further object is to provide a flexible diaphragm construction which is particularly adapted for a device of this type and which may be put in place easily and securely in a short time and need not be replaced except after a long period of use.

A further object of the invention is to provide a special type of mounting for the diaphragm and its supporting perch which will enable it to be readily and quickly fastened to or removed from an automobile.

With these and other objects in view as will be apparent to one skilled in the art, my invention resides in the combination of parts set forth in the specification and covered by the claims appended hereto.

Referring to the drawings in which like reference numerals indicate like parts:

Fig. 4 is a plan view partly broken away of the diaphragm; and

Fig. 5 is an elevation partly in section of the upper member shown in Fig. 3.

Figure 2:
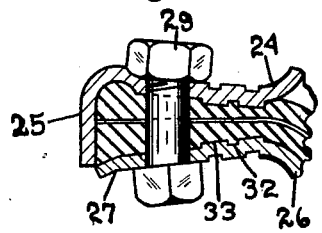
Fig. 2 is an enlarged detailed sectional view showing the manner of fastening the diaphragm to the casing parts.

In accordance with my invention, I have provided a pneumatic shock absorber comprising a hollow bell-shaped casing 10 having a diaphragm 12 fastened across its open end to form an air chamber. An air inlet valve 13 of the usual type serves for introducing air under pressure into the casing. The device may be connected to the spring of an automobile by a suitable construction, such as that shown in Figures 1 and 2 of my prior patent, which comprises parallel depending lugs 15, between which is mounted the bolt 16 passing through a loop in the end of the spring 17.

The diaphragm is mounted on a perch 20 which has a convex portion 21 at its upper end of such size and shape that it will support a considerable area of the diaphragm as the latter moves up and down relative to the casing. The lower end of the bell-shaped support 21 is adapted to contact with a shoulder 22 on the supporting lugs 15, and so limit the relative downward movement of the diaphragm.

In order to fasten the diaphragm to the casing, I provide the latter with an annular flange, and I clamp the peripheral portion of the diaphragm thereto by a movable ring, which is so arranged that pressure exerted to secure the diaphragm in place will serve to squeeze the diaphragm in such a way as to make the joint impervious to air. To this end, the casing 10 is provided with an annular flange 24 which has a downwardly depending rim 25. Similarly the depending support 26 has an outwardly projecting flange 27 of substantially the same size as the flange 24 which will fit within the rim 25 and serves as a clamping ring to hold the diaphragm against the flange 24. These two members are so shaped that they flare outwardly to a slight extent, say about 3°, so that when assembled they form a wedge-shaped space.

The diaphragm 12 is made of flexible material, such as rubber, and is disc-shaped and provided with holes adjacent its periphery. It is placed between the flange 24 and the flange 27 and a number of bolts 29 spaced around the flanged portion of the shock absorber are passed through the diaphragm and clamping members as illustrated. When these bolts are tightened in place, the rubber of the diaphragm is squeezed outwardly so as to fill the wedge-shaped annular space between the clamping members and the rim 25. The pressure on the rubber is greatest where the clamping members are nearest together, which is adjacent the inside of the air chamber, hence the tendency for air to leak past this throat is minimized. The flanges are also provided with opposed annular grooves and projections 32 and 33, so that the rubber is further squeezed between these projecting and depressed portions and is thus held securely in place.

In order to prevent the leakage of air where it is supported on the perch 20, I make the diaphragm imperforate at its central portion and avoid the use of bolts or clamping members passing through the diaphragm. The diaphragm may be located or mounted on its supporting perch by providing it with a centrally located button 35 adapted to be supported in a suitably shaped depression 36 in the top of the perch. This button may be integral with or suitably secured to the diaphragm and preferably consists of a cone-shaped projection of rubber cemented to or molded on the under side of the diaphragm.

In my preferred embodiment, the cone rests loosely in the depression 36 and may be readily removed therefrom. It is held in place by the weight of the car body supported from the casing and diaphragm. Even if the diaphragm momentarily separated from its support, it would fall back into place because of the shape of the associated parts. It will therefore be seen that this manner of supporting the diaphragm will materially decrease the possibility of air leaking from the casing.

The diaphragm is preferably a unitary body of rubber having a multiple-ply cord fabric embedded therein, as shown in Fig. 4. The cords 38 and 39 are encased in rubber and arranged in separate layers, which preferably are separated by the surrounding rubber so that the cords in adjacent layers do not touch, thereby avoiding frictional wear. Those in each layer are parallel to one another, and are not interwoven with a warp thread, except that a light filling thread which breaks easily may be employed to hold the cords together as a fabric until they can be embedded in the rubber.

A shock absorber of this type has a rocking movement largely in one direction as determined by the casing rocking about two pivots, one the bolt 16 and the other the cone 35. This results in transverse stresses being applied to the diaphragm, which should not be transmitted to the cords lengthwise thereof. I prefer therefore to so arrange the cords in the diaphragm and to so mount the latter on the casing that most of the cords extend in a direction lying at an angle to the general direction of a stress caused by the transverse rocking of the casing. To this end, I arrange the cords 38 in one layer at an angle to those in an adjacent layer 39 and I prefer to have them at an angle of 60° or 45°, depending on the number of layers used, so that the various layers will absorb the stresses coming from all directions. It is preferable that no layer of cords be subjected to direct tensional strains due to their lying parallel with the chief direction of stress, but a sufficiently strong diaphragm can be used with a considerable amount of carelessness. It will be seen that the cords run as parallel chords across the circular diaphragm from one side of the casing to the other, so that both ends of each cord are secured at the periphery of the diaphragm and thus directly bear the stresses set up in the flexible member. Since there is no central hole, the diaphragm is not weakened by cutting the longer important cords near the diameter of the disk.

Figure 3:
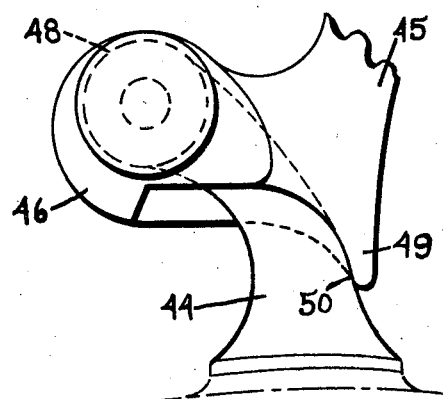
Fig. 3 is a detail in elevation showing the manner of mounting the shock absorber on the front axle of an automobile.
Figure 1:
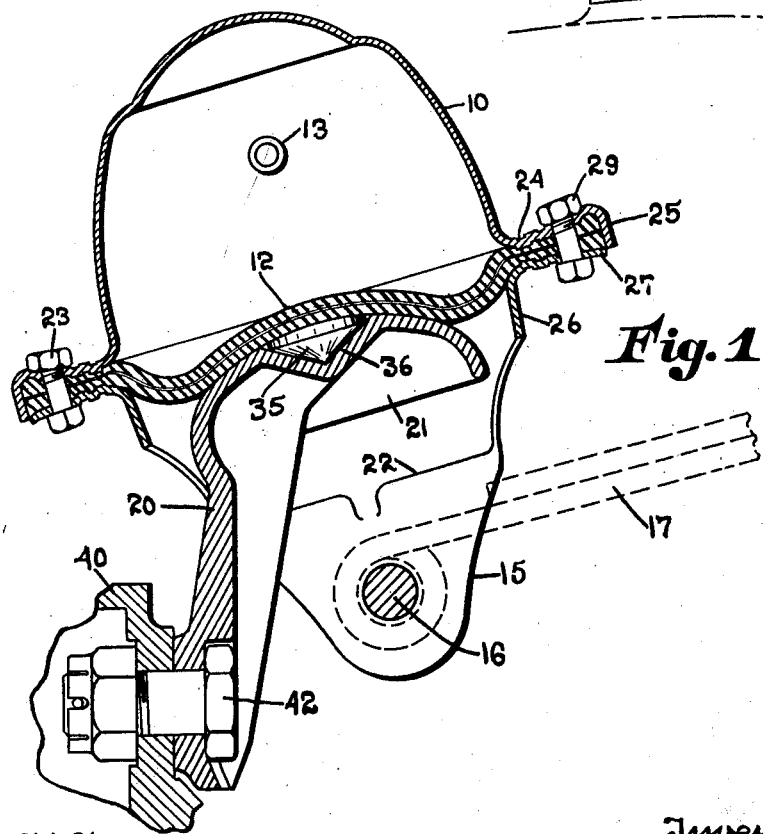
Figure 1 is a vertical section of my shock absorber as shown mounted on the rear end of an automobile.

The lower end of the perch 20 may be fastened rigidly to the rear brake housing 40 of the automobile, as shown in Figure 1, by clamping bolts 42. I have found it desirable to provide a boltless connection at the front of the car. To this end, I make use of the curve-shaped perches 44 (Fig. 3) which are bolted to the front axle of a popular make of automobile, and I turn the two perches so that their curved positions extend outwardly. As shown in Figs. 3 and 5, the perch connection 45, corresponding with the perch 20 of Fig. 1, is provided with a hooded portion 46 having a hook 47 arranged to hang over the upper substantially cylindrical portion 48 of the curve-shaped perch 44 from which it may be readily removed. The perch connection member 45 has a lug 49 so shaped that it normally rests against the face 50 of the perch 44. The hooked portion 47 covers the top of the perch 44 and secures the connecting portions without the use of a bolt or pin. There is no relative movement between hook 47 and the perch 44 during normal usage of the device owing to the location of the various parts and to the fact that the weight of the car and the tension of the car spring tends to hold lug 49 in engagement with the portion 50 of the perch. When desired, the parts may be easily separated by removing pin 16 from the spring end and rotating the device about the round part 48 a short distance until they fall apart.

It will therefore be observed that I have provided a very simple mechanical construction which will effectively minimize the transmission of both vertical and lateral shocks from the chassis to the vehicle body. One may provide a desired air pressure within the casing 10 as determined by the load which the vehicle is to carry and the roughness of the road over which one wishes to travel and suitable adjustment of the pressure may be made at any time as desired. When the car passes over an obstruction any vertical thrust on the chassis is transmitted through the perch to the diaphragm and is directly absorbed by the air cushion. If the thrust of the obstruction tends to move the car body sideways, then the casing 10 will rock about its pivots as permitted by the flexibility of the diaphragm.

Having thus described my invention, what I claim as new and desire to secure by Letters Patent is:

1. A shock absorber for relatively movable vehicle parts comprising an open-ended casing having an annular flange, a flexible diaphragm contacting with the flange and extending across the open end of the casing to form therewith an air container, means including a ring to clamp the diaphragm to the flange, means to connect the ring to one of the vehicle parts, and means to support the diaphragm on the other vehicle part, said ring and flange being angularly disposed so as to form a flared space therebetween and cause a wedging compressional action upon the diaphragm and prevent the escape of air between it and the casing.

2. A shock absorber comprising an open-ended casing, an annular flange at the open end thereof, a clamping ring opposed to the flange, said flange and ring being angularly disposed so as to form an outwardly flaring wedge-shaped space and one of said parts having a rim closing the space therebetween, means to draw the flange and ring together, and a flexible diaphragm disk having its margin clamped between said flange spring and rim compressed into said space.

3. A shock absorber for two relatively movable vehicle parts comprising an open-ended casing, a substantially disk shaped flexible diaphragm having a central imperforate portion, means to fasten the margin of said diaphragm to the casing and across said open end to form an air chamber, a perch supported on one vehicle part, and means to connect the casing with the other part, said diaphragm and perch having interfitting portions so arranged that the diaphragm is removably and loosely supported on the perch.

4. A shock absorber for two relatively movable vehicle parts comprising an open-ended casing, a flexible diaphragm, means to fasten the margin thereof across said open end to form an air container, means to connect the casing to one vehicle part, and a perch supported on the other part and having a depression on its upper face, said diaphragm having a centrally located projection on its under side which interfits removably with said depression and is so arranged that the diaphragm is thereby freely supported on the perch.

5. A shock absorber for two relatively movable vehicle parts comprising an open-ended casing, a flexible diaphragm disk, means to clamp the disk removably across said open end to form an air container, a hinged connection between the casing and one vehicle part, and a perch supported on the other vehicle part which has a depression in its upper face, said diaphragm being centrally imperforate and having a projecting portion fastened thereto which rests freely in said depression and is arranged to serve as a pivot about which the diaphragm and casing may rock.

6. A shock absorber for two relatively movable vehicle parts comprising an open-ended casing, a flexible diaphragm, means to fasten the diaphragm across the open end of the casing to form an air container, means to connect the casing to one vehicle part, and a perch connection supporting the diaphragm centrally which is removably hooked to the other vehicle part.

7. A shock absorber for two relatively movable vehicle parts comprising an open-ended casing, a flexible diaphragm clamped across the open end thereof to form an air container, means to connect the casing to one vehicle part, a perch connection supporting the diaphragm, means for removably hooking said connection to the other vehicle part, and means to prevent movement of the perch connection relative to said part during normal usage of the device.

8. A diaphragm for a pneumatic shock absorber comprising a disk of flexible material which is centrally imperforate and has layers of parallel cords embedded therein which extend as chords between opposite marginal portions of the disk, the set of cords in one layer lying at an angle to those in an adjacent layer and said diaphragm being so constructed and arranged that it may be connected marginally and centrally to two relatively movable shock absorber parts.

9. A diaphragm for a pneumatic device comprising a flexible disk having parallel sets of reinforcing cords embedded therein, the cords of one set lying at an angle to those in another set, and a supporting button integral with the disk which projects centrally from one face thereof.

10. A diaphragm for a pneumatic device comprising a flexible, rubber disk having an imperforate central portion and a perforated margin, a button integral with and projecting from one side of the disk and sets of parallel reinforcing cords embedded in the rubber which are arranged as chords between opposite marginal portions of the disk, the cords in one set lying at an angle to the cords in an adjacent set and out of contact therewith.

Signed at Worcester, Massachusetts, this 9th day of March 1925.

EDWARD VAN DER PYL.